(12) United States Patent
Kim et al.

(10) Patent No.: US 8,383,258 B2
(45) Date of Patent: Feb. 26, 2013

(54) CAP ASSEMBLY OF IMPROVED SAFETY AND CYLINDRICAL SECONDARY BATTERY EMPLOYED WITH THE SAME

(75) Inventors: Sungjong Kim, Chungcheongnam-do (KR); Byung Kyu Jung, Daejeon (KR); SooRyoung Kim, Daejeon (KR); Chahun Ku, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 12/846,873

(22) Filed: Jul. 30, 2010

(65) Prior Publication Data

US 2011/0008654 A1  Jan. 13, 2011

Related U.S. Application Data

(63) Continuation of application No. PCT/KR2009/005407, filed on Sep. 23, 2009.

(30) Foreign Application Priority Data

Oct. 14, 2008 (KR) .......................... 10-2008-0100679

(51) Int. Cl.
*H01M 2/12* (2006.01)
(52) U.S. Cl. ................ 429/56; 429/53; 429/54; 429/72; 429/82
(58) Field of Classification Search .................... 429/53, 429/54, 56, 72, 82
See application file for complete search history.

(56) References Cited

U.S. PATENT DOCUMENTS 5,821,008 A    10/1998  Harada et al.
2007/0154789 A1*  7/2007  Chang et al. .................. 429/130

FOREIGN PATENT DOCUMENTS

| JP | 09-199106 A | 7/1997 |
| KR | 10-0399343 B1 | 9/2003 |
| KR | 10-0619631 B1 | 8/2006 |
| KR | 10-0858414 B1 | 9/2008 |

OTHER PUBLICATIONS

KR-1020060020211—Translation.*

* cited by examiner

*Primary Examiner* — Patrick Ryan
*Assistant Examiner* — Ladan Mohaddes
(74) *Attorney, Agent, or Firm* — Birch, Stewart, Kolasch & Birch, LLP

(57) ABSTRACT

Disclosed herein is a cap assembly loaded on an open upper end of a cylindrical container of a battery in which an electrode assembly is mounted in the cylindrical container, the cap assembly including a safety vent having a predetermined notch configured to rupture by high-pressure gas generated in the battery, a current interruptive device coupled to a bottom of the safety vent by welding for interrupting current when internal pressure of the battery increases, and a current interruptive device gasket for surrounding an outer circumference of the current interruptive device, wherein the current interruptive device includes two or more through holes for gas discharge, the through holes being formed such that the sum of areas of the through holes is equal to 20% to 50% of an entire area of the current interruptive device. When high-pressure gas is generated in the battery, the cap assembly effectively interrupts current and rapidly discharges the gas, thereby greatly improving safety of the battery.

10 Claims, 12 Drawing Sheets

CAP ASSEMBLY OF IMPROVED SAFETY AND CYLINDRICAL SECONDARY BATTERY EMPLOYED WITH THE SAME

CROSS REFERENCE TO RELATED APPLICATIONS

This application is a Continuation of PCT International Application No. PCT/KR2009/005407 filed on Sep. 23, 2009, which claims the benefit of Patent Application No. 10-2008-0100679 filed in Republic of Korea, on Oct. 14, 2008. The entire contents of all of the above applications is hereby incorporated by reference into the present application.

TECHNICAL FIELD

The present invention relates to a cap assembly of improved safety and a cylindrical secondary battery including the same, and, more particularly, to a cap assembly loaded on an open upper end of a cylindrical container of a battery in which an electrode assembly is mounted in the cylindrical container, the cap assembly including a safety vent having a predetermined notch configured to rupture by high-pressure gas generated in the battery, a current interruptive device coupled to a bottom of the safety vent by welding for interrupting current when internal pressure of the battery increases, and a current interruptive device gasket for surrounding an outer circumference of the current interruptive device, wherein the current interruptive device includes two or more through holes for gas discharge, the through holes being formed such that the sum of areas of the through holes is equal to 20% to 50% of an entire area of the current interruptive device.

BACKGROUND ART

As mobile devices have been increasingly developed, and the demand of such mobile devices has increased, the demand of secondary batteries has also sharply increased as an energy source for the mobile devices. Among such secondary batteries is a lithium secondary battery having high energy density and high discharge voltage, into which much research has been carried out and which is now commercially and widely used.

Depending upon the shape of a battery case, a secondary battery may be classified as a cylindrical battery having an electrode assembly mounted in a cylindrical metal container, a prismatic battery having an electrode assembly mounted in a prismatic metal container, or a pouch-shaped battery having an electrode assembly mounted in a pouch-shaped case formed of an aluminum laminate sheet. The cylindrical battery has advantages in that the cylindrical battery has relatively large capacity and is structurally stable.

The electrode assembly mounted in the battery case is a power generating element, having a cathode/separator/anode stack structure, which can be charged and discharged. The electrode assembly may be classified as a jelly roll type electrode assembly constructed in a structure in which a long sheet type cathode and a long sheet type anode, to which active materials are applied, are wound while a separator is disposed between the cathode and the anode or a stacked type electrode assembly constructed in a structure in which pluralities of cathodes and anodes having a predetermined size are sequentially stacked while separators are disposed respectively between the cathodes and the anodes. The jelly roll type electrode assembly has advantages in that the jelly roll type electrode assembly is easy to manufacture and has high energy density per weight.

FIG. 1 is a vertical sectional perspective view typically illustrating a general cylindrical secondary battery.

Referring to FIG. 1, a cylindrical secondary battery 10 is manufactured by inserting a jelly roll type (wound type) electrode assembly 120 into a cylindrical case 130, injecting an electrolyte into the cylindrical case 130, and coupling a top cap 140 having an electrode terminal (not shown), for example a cathode terminal, to the upper end, which is open, of the cylindrical case 130.

The electrode assembly 120 is constructed in a structure in which a cathode 121 and an anode 122 are wound in a circle while a separator 123 is interposed between the cathode 121 and the anode 122. A cylindrical center pin 150 is disposed at the center of the winding (the center of the jelly roll). The center pin 150 is generally made of a metal material to exhibit predetermined strength. The center pin 150 is constructed in a hollow cylindrical structure formed by rolling a metal sheet. The center pin 150 serves to fix and support the electrode assembly. In addition, the center pin 150 serves as a passage to discharge gas generated by internal reaction of the secondary battery when charging, discharging, and operating the secondary battery.

Meanwhile, a lithium secondary battery has a disadvantage in that the lithium secondary battery has low safety. For example, when the secondary battery is overcharged to approximately 4.5 V or more, a cathode active material is decomposed, dendritic growth of lithium metal occurs at an anode, and an anode active material is decomposed. At this time, heat is generated from the secondary battery, with the result that the above-mentioned decompositions and several sub decompositions rapidly progress, and, eventually, the secondary battery may catch fire and explode.

In order to solve the above-mentioned problems, therefore, a general cylindrical secondary battery includes a current interruptive device (CID) and a safety vent mounted between the electrode assembly and the top cap for interrupting current and releasing internal pressure when the operation of the secondary battery is abnormal.

The above-described components will be described hereinafter with reference to FIGS. 2 to 4.

Referring to these drawings, a top cap 10 protrudes to form a cathode terminal. The top cap 10 has exhaust ports. Below the top cap 10 are sequentially disposed a positive temperature coefficient (PTC) element 20 for interrupting current through the great increase of battery resistance when the interior temperature of the battery increases, a safety vent 30 configured to have a downward depressed shape in a normal state and to protrude and rupture for discharging gas when the interior pressure of the battery increases, and a connection plate 50 coupled to the safety vent 30 at one side of the upper end thereof and connected to a cathode of an electrode assembly 40 at one side of the lower end thereof.

In normal operating conditions, therefore, the cathode of the electrode assembly 40 is connected to the top cap 10 via a lead 42, the connection plate 50, the safety vent 30, and the PTC element 20 to achieve electric conduction.

However, when gas is generated from the electrode assembly 40 due to various causes, such as overcharging, with the result that the internal pressure of the battery increases, as shown in FIG. 3, the shape of the safety vent 30 is inversed. That is, the safety vent 30 protrudes upward. At this time, the safety vent 30 is separated from the connection plate 50 to interrupt current. As a result, the overcharging is prevented from further progressing, thereby achieving safety. However, when the internal pressure of the battery continues to increase, as shown in FIG. 4, the safety vent 30 ruptures, with the result that the pressurized gas is discharged through the exhaust ports of the top cap 10 via the rupture of the safety vent 30, thereby preventing explosion of the battery.

However, this operating process is absolutely dependent on the amount of gas generated from the electrode assembly or the amount of gas discharged from the battery. If the amount of generated gas or the amount of discharged gas is not sufficient or does not increase to a predetermined level within a short period of time, a short circuit may occur late, and a thermal runaway phenomenon may occur due to continuous electric conduction of the electrode assembly. The thermal runaway phenomenon occurs or is further accelerated when the battery is in continuous electric conduction, with the result that a possibility of the battery catching fire or exploding greatly increases. Consequently, the safety of the battery is seriously threatened. Furthermore, there have continuously occurred ignition accidents of laptop computers in recent years, and therefore, the importance of the safety of the battery is being further emphasized.

Therefore, there is a high necessity for development of a cap assembly that is capable of rapidly discharging gas out of a battery when the gas is generated in the battery due to various causes, such as overcharging, with the result that the internal pressure of the battery increases.

DISCLOSURE

Technical Problem

Therefore, the present invention has been made to solve the above problems, and other technical problems that have yet to be resolved.

Specifically, it is an object of the present invention to provide a cap assembly of improved safety that is capable of rapidly pressurized gas out of a battery.

It is another object of the present invention to provide a lithium secondary battery of improved safety achieved by using a cap assembly of improved safety.

Technical Solution

In accordance with one aspect of the present invention, the above and other objects can be accomplished by the provision of a cap assembly loaded on an open upper end of a cylindrical container of a battery in which an electrode assembly is mounted in the cylindrical container, the cap assembly including a safety vent having a predetermined notch configured to rupture by high-pressure gas generated in the battery, a current interruptive device coupled to the bottom of the safety vent by welding for interrupting current when internal pressure of the battery increases, and a current interruptive device gasket for surrounding the outer circumference of the current interruptive device, wherein the current interruptive device includes two or more through holes for gas discharge, the through holes being formed such that the sum of areas of the through holes is equal to 20% to 50% of the entire area of the current interruptive device.

The current interruptive device may be configured to rupture for interrupting current when the interior pressure of the battery increases. The current interruptive device may be constructed in a structure in which the current interruptive device is provided at a center thereof with a protrusion configured to protrude upward such that the protrusion is fixed to the bottom of a depression of the safety vent by welding, and a cathode lead connected to a cathode of a jelly roll is electrically connected to the current interruptive device via the bottom of the depression excluding the protrusion.

Since the current interruptive device is coupled to the safety vent as described above, the connection between the current interruptive device and the cathode ruptures, when the shape of the safety vent is inversed, thereby interrupting current. In a concrete example, the protrusion may be provided at the outer circumference thereof with a notch. When the shape of the safety vent is inversed, the notch ruptures, with the result that the separation between the current interruptive device and the cathode may be easily achieved in a state in which the protrusion is coupled to the safety vent.

Also, the current interruptive device may be provided with two or more through holes through which gas flows upward. Gas in the battery raises through the through holes to inverse the shape of the safety vent.

However, the inventors of the present application have experimentally found that, when the sum of areas of the through holes formed at the current interruptive device is less than 20% of the entire area of the current interruptive device, the battery more easily catches fire or explodes due to high pressure generated in the battery. This may be because the amount of gas passing through the through holes is small, and therefore, current interruption is not effectively achieved or because upward flow of gas is interrupted or changed, and therefore, time necessary to interrupt current is increased. On the other hand, when the size of the through holes is excessively large, it is difficult to secure predetermined strength, and, parts may be twisted during the manufacture of the current interruptive device, which is not preferable.

In the cap assembly according to the present invention, the current interruptive device includes two or more through holes for gas discharge, and the through holes are formed such that the sum of areas of the through holes is equal to 20% to 50%, more preferably 30% to 40%, of the entire area of the current interruptive device. As a result, it is possible to increase the amount of upward-flowing gas (the amount of discharged gas) and to achieve rapid upward flow (discharge) of the gas.

Consequently, when gas is generated in the battery due to various causes, such as overcharging, with the result that the internal pressure of the battery increases, the gas is rapidly discharged out of the battery by current interruption and rupture of the safety vent, thereby securing safety of the battery.

The through holes may be formed in a shape of an arc such that the through holes are radially symmetrical about a center of the current interruptive device. When the through holes are radially symmetrical as described above, excessive discharge of gas in one direction is prevented, and the strength of the current interruptive device is secured.

The number of the through holes is not particularly restricted. Preferably, the number of the through holes is 2 to 4.

In a preferred example, three through holes may be arranged at regular intervals such that the through holes each have an arc shape corresponding to an angle of 50 to 80 degrees about the center of the current interruptive device.

Meanwhile, the protrusion may be formed in a structure in which three to five through slits are formed on a concentric circle of the protrusion, and bridges are formed on the concentric circle of the protrusion for interconnecting the through slits, each of the bridges having a notch. In this case, the through slits may be arranged at regular intervals such that the through slits correspond to the through holes, preferably the through slits each have an arc shape corresponding to an angle of 40 to 55 degrees about the center of the current interruptive device.

The safety vent is a device that discharges gas out of the battery, when the internal pressure of the battery increases, to secure safety of the battery. For example, when gas is generated in the battery, with the result that the internal pressure of the battery reaches a critical value, the safety vent ruptures, and therefore, gas passes through the rupture of the safety vent and is then discharged out of the battery through one or more exhaust ports formed in a top cap.

The safety vent may be provided at a center thereof with a depression configured to be depressed downward. In this structure, the depression of the safety vent is inversed, i.e., the downward depressed shape of the center of the safety vent is inversed into the upward protruding shape of the center of the safety vent, when the internal pressure of the battery increases, with the result that the safety vent is separated from the current interruptive device, thereby interrupting electric connection.

The operation of the safety vent is as follows. Gas generated in the battery passes through the through holes of the current interruptive device to apply upward pressure to the safety vent. When the upward pressure reaches a predetermined pressure (hereinafter, referred to as 'first critical pressure'), the shape of the downward depression of the safety vent is inversed, with the result that the protrusion fixed to the depression is separated from the current interruptive device to interrupt electric conduction from the current interruptive device to the safety vent.

The depression may include an upper bent portion and a lower bent portion. A first notch may be formed at the upper bent portion. In the related art, a structure in which only the lower bent portion is cut off has been proposed. However, the lower bent portion is not suitable for effective gas discharge because the lower bent portion has a small area. According to the present invention, on the other hand, a notch configured to rupture is formed at the upper bent portion, with the result that the cutoff area is relatively large, and therefore, it is possible to rapidly discharge a large amount of gas.

When the internal pressure of the battery continuously increases in spite of the current interruption achieved by the safety vent, with the result that the internal pressure of the battery reaches another predetermined pressure (hereinafter, referred to as 'second critical pressure'), the first notch is cut off. Consequently, pressurized gas in the battery is discharged out of the battery through the exhaust ports of the top cap.

Meanwhile, the first notch may be configured in a shape of an open curve, one side of which is open to prevent the entirety of the upper bent portion from being separated from the remaining portion of the safety vent. That is, the one-side open region serves as a bridge between the depression and the remaining portion of the safety vent.

The size of the first notch is not particularly restricted. Preferably, the first notch has a size corresponding to that of an imaginary circle formed by linking centers of the through holes formed in the current interruptive device such that gas flowing upward from the current interruptive device directly applies pressure to the first notch.

Also, as previously described, the open region of the first notch may have a size to prevent the depression from being completely cut off when the first notch is cut off. The open region of the first notch may have an arc length corresponding to an angle of preferably 20 to 50 degrees, more preferably 25 to 40 degrees, about the center of the safety vent.

In a preferred example, second notches may be formed at the lower bent portion of the safety vent. Preferably, the second notches are configured in the shape of open curves, opposite ends of which are open such that only the upper bent portion is cut off when the internal pressure of the battery increases. In the structure in which the opposite ends are open, the cutoff of the lower bent portion is restrained, and opening due to the cutoff of the upper bent portion is achieved, when the internal pressure of the battery increases.

Preferably, the open opposite sides of the second notch are not aligned with the open region of the first notch. In a more preferred example, the open opposite sides of the second notch may be located approximately at a right angle to the open region of the first notch.

In a preferred example, the first notch may have a greater depth than the second notches such that the first notch ruptures (is cut off) before the second notches.

The material for the safety vent is not particularly restricted. Preferably, the safety vent is formed of an aluminum sheet having a thickness of 0.15 to 0.4 mm such that the safety vent ruptures (is cut off) when the internal pressure of the battery reaches a critical value.

The current interruptive device gasket is configured to surround the outer circumference of the current interruptive device. In a preferred example, the current interruptive device gasket may have an opening formed in the center thereof. Since it is preferable to configure the flow path of pressurized gas in a straight line such that the upward flow of the gas is efficiently achieved, the central opening of the current interruptive device gasket may be configured in a shape not to cover the through holes of the current interruptive device.

In the related art, the gasket is formed into a shape to partially cover the through holes of the current interruptive device. Therefore, the flow of high-pressure gas, having passed through the through holes, is disturbed by the gasket, with the result that the amount of discharged gas is reduced, and the flow path of gas is changed, whereby it is difficult to achieve prompt operation of the safety vent. In the structure in which the gasket does not cover the through holes as previously described, on the other hand, the entirety of high-pressure gas, having passed through the through holes, reaches directly to the safety vent, thereby further securing safety of the battery.

In a preferred example, the through holes of the current interruptive device, the opening of the current interruptive device gasket, and the notch of the safety vent may be aligned with one another in a straight line.

Until high-pressure gas generated in the battery reaches the notch of the safety vent through the through holes of the current interruptive device and the opening of the current interruptive device gasket, the gas flow path is maintained in a straight line, with the result that the high-pressure gas flows upward intensively and rapidly. Consequently, the prompt operation of the safety vent is achieved, thereby securing safety of the battery.

According to circumstances, the cap assembly according to the present invention may further include a positive temperature coefficient (PTC) element for interrupting current through the great increase of battery resistance when the interior temperature of the battery increases.

The cap assembly may be constructed in a structure in which the current interruptive device, the current interruptive device gasket, the safety vent, the PTC element, and the top cap having one or more exhaust ports are stacked. Also, a gasket may be further mounted to the outer circumference of the stacked structure. The PTC element may be disposed between the top cap and the safety vent in a tight contact state.

In accordance with another aspect of the present invention, there is provided a cylindrical battery including the cap assembly with the above-stated construction and an electrode assembly (jelly roll) of a cathode/separator/anode structure. The cylindrical battery is manufactured by inserting the jelly roll into a cylindrical container, injecting an electrolyte into the cylindrical container, and coupling a top cap 140 having an electrode terminal to the upper end, which is open, of the cylindrical container.

In a preferred example, the cylindrical battery may further include a disc-shaped insulating member loaded on the upper end of the jelly roll. The disc-shaped insulating member may be provided at the center thereof with an opening for gas discharge and electrode terminal connection. Also, the disc-shaped insulating member may be provided around the opening with at least one through hole.

In this case, it is preferable for the at least one through hole of the disc-shaped insulating member to have a size sufficient to be aligned with the opening of the current interruptive device gasket and the through holes of the current interruptive device in a straight line such that the at least one through hole of the disc-shaped insulating member communicates with the opening of the current interruptive device gasket and the through holes of the current interruptive device. For example, the at least one through hole may have a size equivalent to 20% to 50% of the area of the disc-shaped insulating member.

The material for the insulating member is not particularly restricted as long as the insulating member is formed of an insulative material. For example, the insulating member may be formed of a polypropylene resin. The high-strength polypropylene resin may be particularly preferably used since the polypropylene resin exhibits a high mechanical strength to thickness ratio, and therefore, the polypropylene resin prevents movement and short circuit of the jelly roll when strong external impact is applied to the battery.

The jelly roll is constructed in a structure in which a cathode and an anode are wound in a circle while a separator is interposed between the cathode and the anode. A cylindrical center pin is disposed at the center of the winding (the center of the jelly roll). The center pin is generally made of a metal material to exhibit predetermined strength. The center pin is constructed in a hollow cylindrical structure formed by rolling a metal sheet. The center pin serves to fix and support the electrode assembly. In addition, the center pin serves as a passage to discharge gas generated by internal reaction of the battery when charging, discharging, and operating the battery.

The material for the cylindrical container is not particularly restricted. Preferably, the cylindrical container is formed of stainless steel, steel, aluminum, or an equivalent thereof.

The cylindrical battery according to the present invention may be a lithium secondary battery having high energy density, high discharge voltage, and high output stability. The lithium secondary battery generally includes a cathode, an anode, a separator, and a nonaqueous electrolyte containing lithium salt.

The cathode may be manufactured, for example, by applying a mixture of a cathode active material, a conductive material, and a binder to a cathode current collector and drying the applied mixture. A filler may be further added as needed. The anode may be manufactured by applying an anode material to an anode current collector and drying the applied anode material. The above-mentioned ingredients may be further added as needed.

The separator is disposed between the anode and the cathode. The separator may be made of an insulative thin film exhibiting high ion permeability and high mechanical strength.

The nonaqueous electrolyte containing lithium salt consists of a nonaqueous electrolyte and lithium salt. The nonaqueous electrolyte may include a liquid nonaqueous electrolyte, a solid nonaqueous electrolyte, and an inorganic solid nonaqueous electrolyte.

The current collector, the electrode active material, the conductive material, the binder, the filler, the separator, the electrolyte, and the lithium salt are well known in the art to which the present invention pertains, and therefore, a detailed description thereof will not be given.

The lithium secondary battery according to the present invention may be manufactured by a general method well known in the art to which the present invention pertains. That is, the lithium secondary battery may be manufactured by placing a porous separator between a cathode and an anode and injecting an electrolyte thereinto.

For example, as previously described, the cathode may be manufactured by applying a slurry including a lithium transition metal oxide active material, as a cathode active material, a conductive material, and a binder to a current collector and drying and pressing the slurry. In the same manner, as previously described, the anode may be manufactured by applying slurry including a carbon active material, as an anode active material, a conductive material, and a binder to a thin current collector and drying the slurry.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
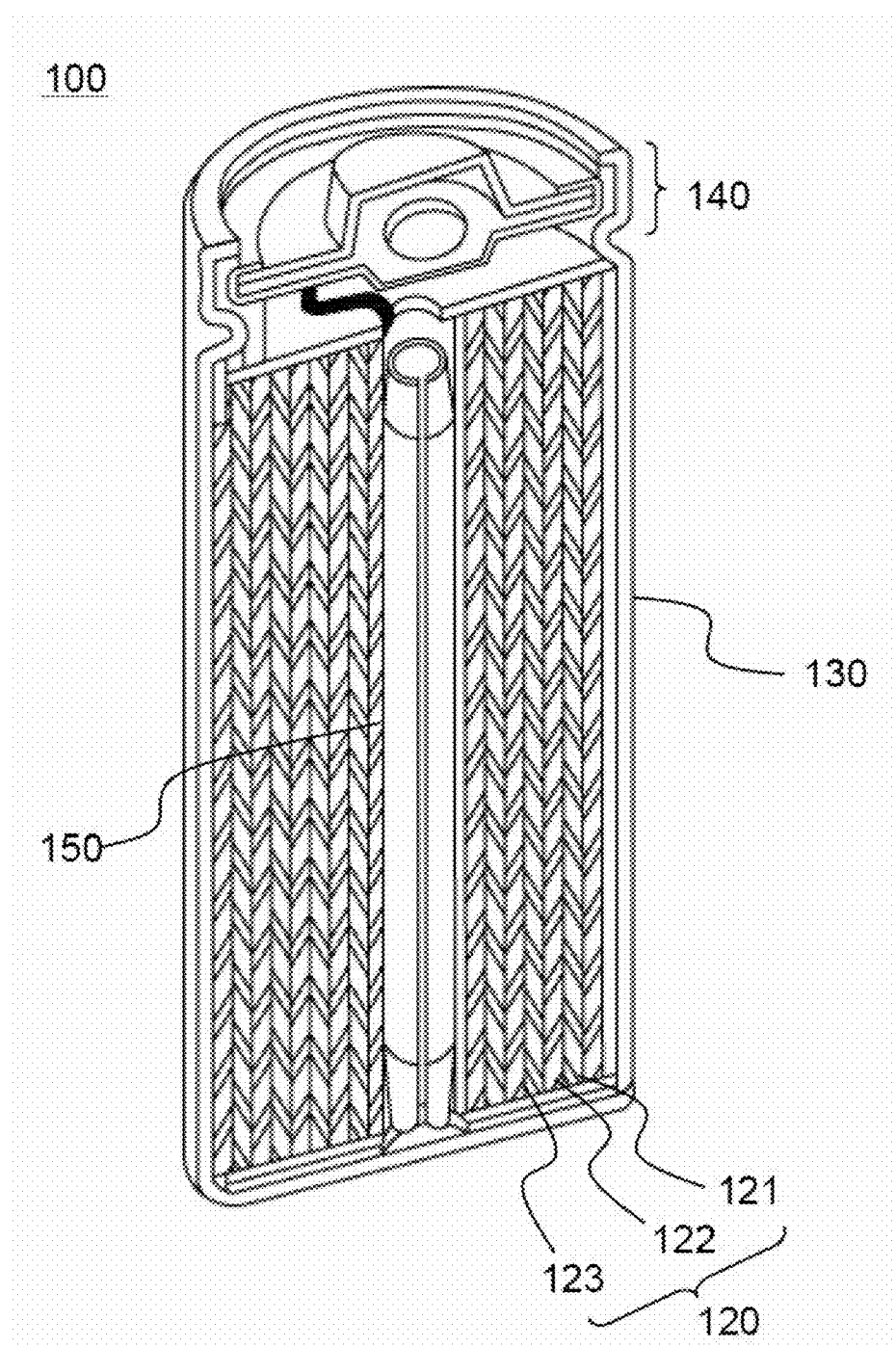
FIG. 1 is a vertical sectional perspective view illustrating a general cylindrical secondary battery.
Figure 2:
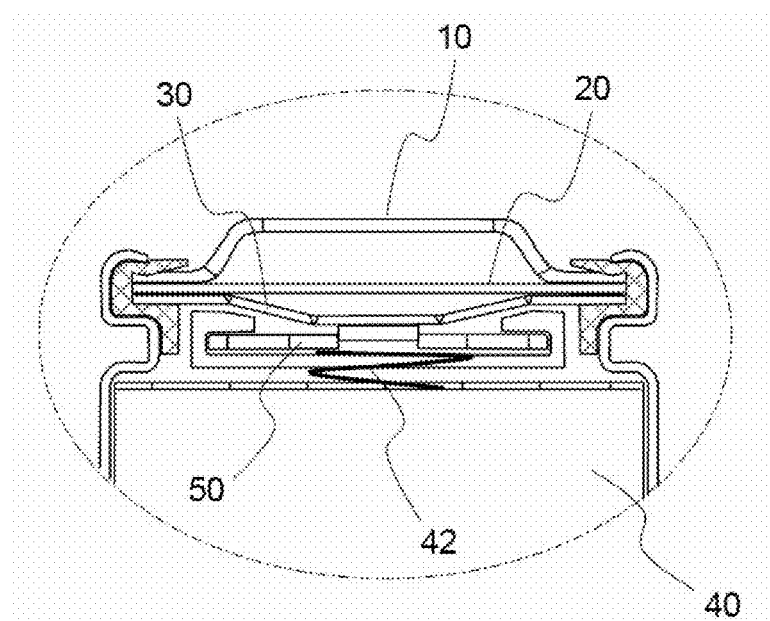
FIGS. 2 to 4 are vertical sectional views illustrating a series of processes for interrupting current and discharging high-pressure gas by the operation of a safety element in a conventional cylindrical secondary battery.
Figure 3:
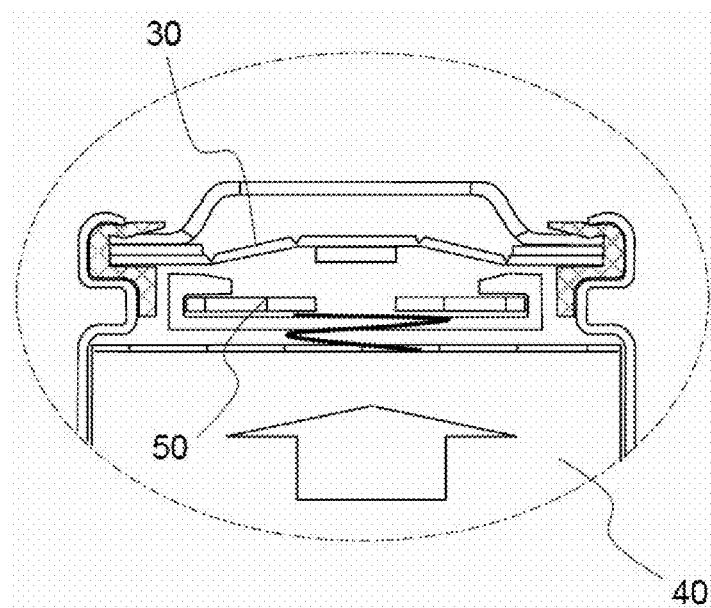
Figure 4:
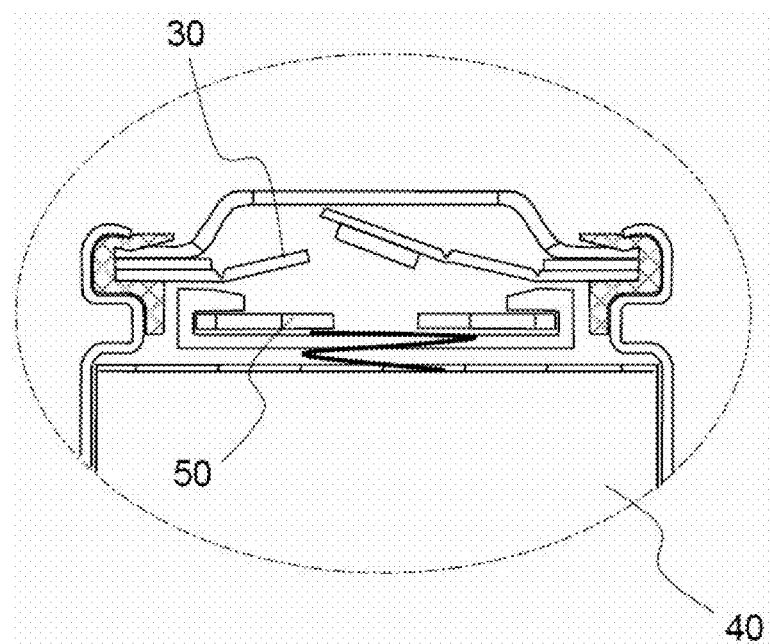
Figure 5:
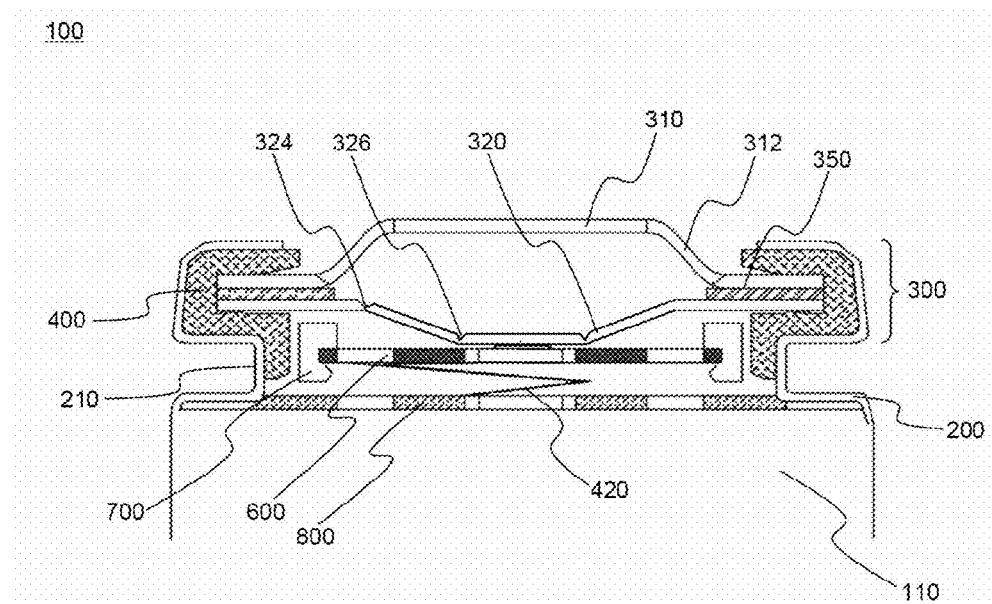
FIG. 5 is a typical sectional view illustrating a cylindrical secondary battery according to an embodiment of the present invention.
Figure 6:
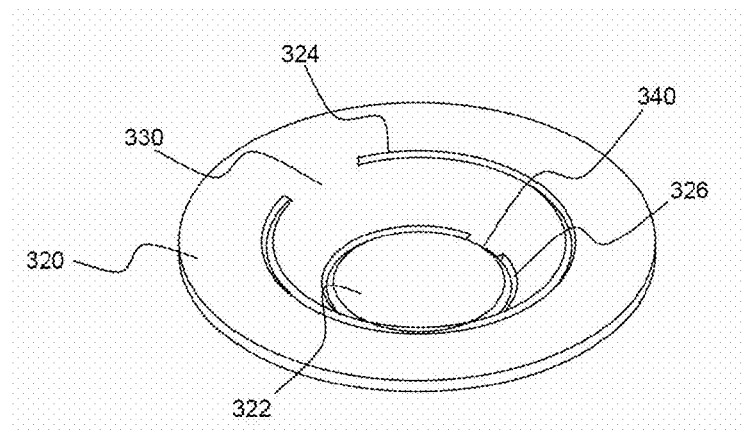
FIGS. 6 and 7 are perspective and plan views illustrating a safety vent used in the secondary battery of FIG. 5, respectively.
Figure 7:
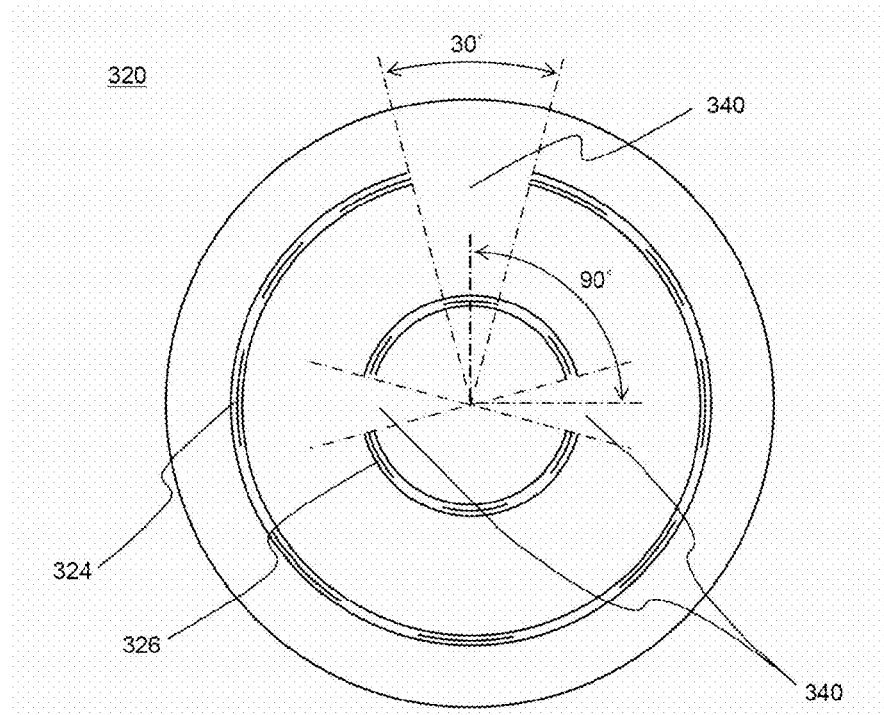

FIG. 5 is a typical sectional view illustrating the structure of a cap assembly of a cylindrical battery according to an embodiment of the present invention, and FIGS. 6 and 7 are perspective and plan views illustrating a safety vent used in the cylindrical battery of FIG. 5, respectively.

Referring first to FIG. 5, a cylindrical battery 100 is manufactured by inserting a jelly roll 110 into a cylindrical container 200, injecting an electrolyte into the cylindrical container 200, loading a disc-shaped insulating member 800 on the upper end of the jelly roll 110, and mounting a cap assembly 300 to the upper end, which is open, of the cylindrical container 200.

The cap assembly 300 is constructed in a structure in which a top cap 310, a PTC element 350, and a safety vent 320 for reducing the internal pressure of the battery are disposed in an airtight gasket 400 mounted at an upper beaded part 210 of the cylindrical container 200 while being in tight contact with one another.

A current interruptive device 600 configured to rupture for interrupting current when the interior pressure of the battery increases is coupled to the lower end of the safety vent 320 by welding. The current interruptive device 600 is surrounded by a current interruptive device gasket 700.

The PTC element 350 is disposed between the top cap 310 and the safety vent 320 in a tight contact state. The PTC element 350 greatly increases battery resistance, when the internal temperature of the battery increases, to interrupt current. The top cap 310 protrudes upward at the middle thereof to serve as a cathode terminal for connection with an external circuit. A plurality of exhaust ports 312 are formed along the circumference of the protrusion of the top cap 310 such that pressurized gas is discharged out of the cylindrical container 200 through the exhaust ports 312.

The structure of the safety vent 320 of the cap assembly 300 constructed as described above will be described in more detail with reference to FIGS. 6 and 7.

The safety vent 320 is a thin-film structure transmitting current. At the center of the safety vent 320 is formed a depression 322, which is depressed downward. A first notch 324 is formed at an upper bent portion of the safety vent 320. Second notches 326 are formed at a lower bent portion of the safety vent 320.

As shown in FIG. 7, which illustrates a plan view of the safety vent 320, the first notch 324, formed at the upper bent portion of the safety vent 320, is configured in the shape of an open curve, one side of which is open. The open region is a non-notch portion 330, which prevents the entirety of the first notch 324 from being separated from the remaining portion of the safety vent 320 by virtue of the non-notch portion 330 when the notch forming region is cut off by high-pressure gas.

Also, the second notches 326 are formed at the lower bent portion of the safety vent 320. The second notches 326 are configured in the shape of open curves, opposite ends of which are open. Two non-notch portions 340 are located at the open opposite end regions of the second notches 326. The non-notch portions 340 prevent the second notches 326 from being separated by cutoff. In order to securely prevent the separation of the second notches 326, it is preferable for the non-notch portions 340 to be located at positions where the non-notch portions 340 are not aligned with the non-notch portion 330 of the first notch 324. More preferably, as shown in the drawing, the second notches 326 are located approximately at a right angle to the center line of the non-notch portion 330 of the first notch 324, and the two non-notch portions 340 are opposite to each other.

Figure 8:
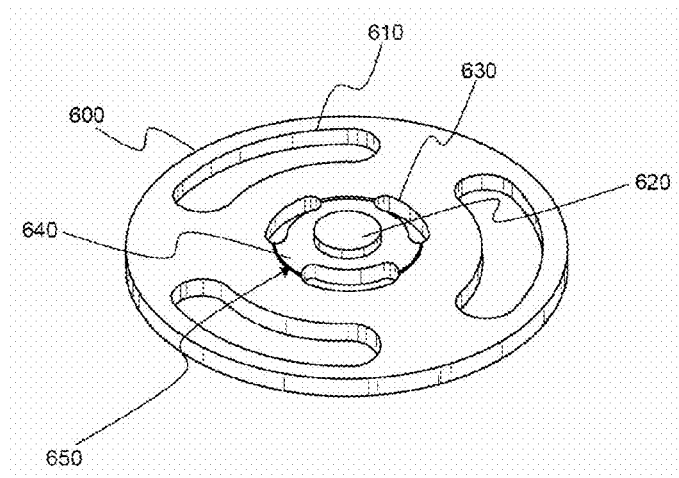
FIGS. 8 and 9 are perspective and plan views illustrating a current interruptive device used in the secondary battery of FIG. 5, respectively.
Figure 9:
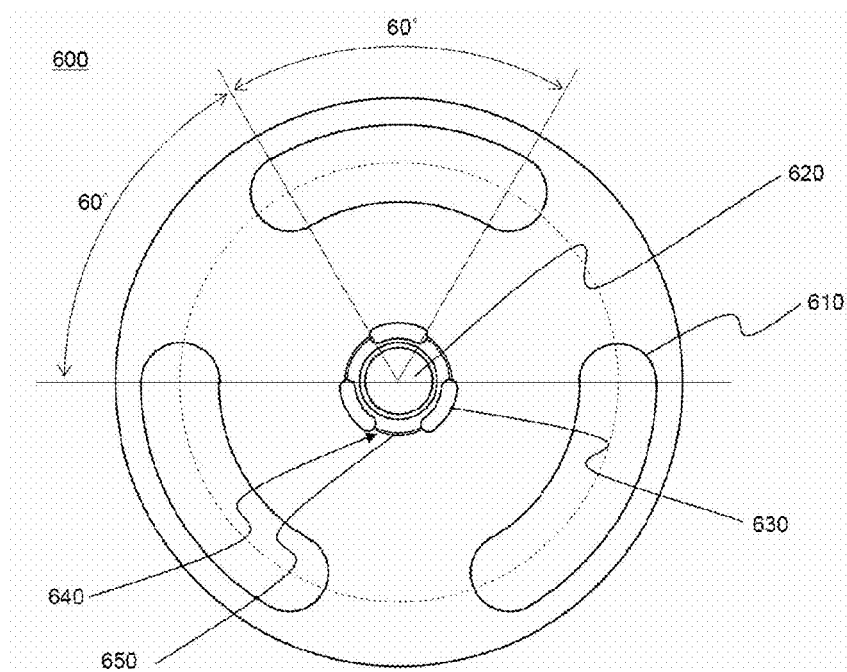

FIGS. 8 and 9 are perspective and plan views illustrating a current interruptive device 600 used in the secondary battery of FIG. 5, respectively.

Referring to FIGS. 8 and 9 together with FIG. 5, a protrusion 620, which protrudes upward, is formed at the center of the current interruptive device 600. The protrusion 620 is fixed to the bottom of the depression 322 (See FIG. 6) of the safety vent 320. A cathode lead 420, connected to a cathode of the jelly roll 110, is electrically connected to the remaining bottom region of the current interruptive device 600 excluding the protrusion 620.

On a concentric circle of the protrusion 620 are formed three through slits 630 and bridges 640 having notches 650 to interconnect the through slits 630.

Also, three through holes 610 for gas discharge are formed at the outer circumference of the current interruptive device 600 in the shape of an arc such that the through holes 610 are radially symmetrical about the central axes thereof. The sum of areas of the through holes is equivalent to 30% of the entire area of the current interruptive device 600. Consequently, the amount of high-pressure gas discharged from the battery is increased, thereby achieving a reliable current interruption effect. The through holes 610 are arranged at intervals of approximately 120 degrees. The shapes and sizes of the respective through holes 610 are the same. The distances between the respective through holes 610 are approximately the same. With this structure, it is possible for the current interruptive device 600 to maintain high mechanical strength while maximizing the amount of discharged gas.

It is preferable for a size of a circle (See the dotted line) linking the center lines of the respective through holes 610 to be approximately equal to the size of the first notch 324 of the safety vent 320 (See FIGS. 6 and 7). When the internal pressure of the battery exceeds a predetermined level, therefore, high-pressure gas, having passed through the through holes 610, pressurizes the first notch 324 in a straight line to accelerate the cutoff of the first notch 324, thereby achieving rapid discharge of the gas.

Figure 10:
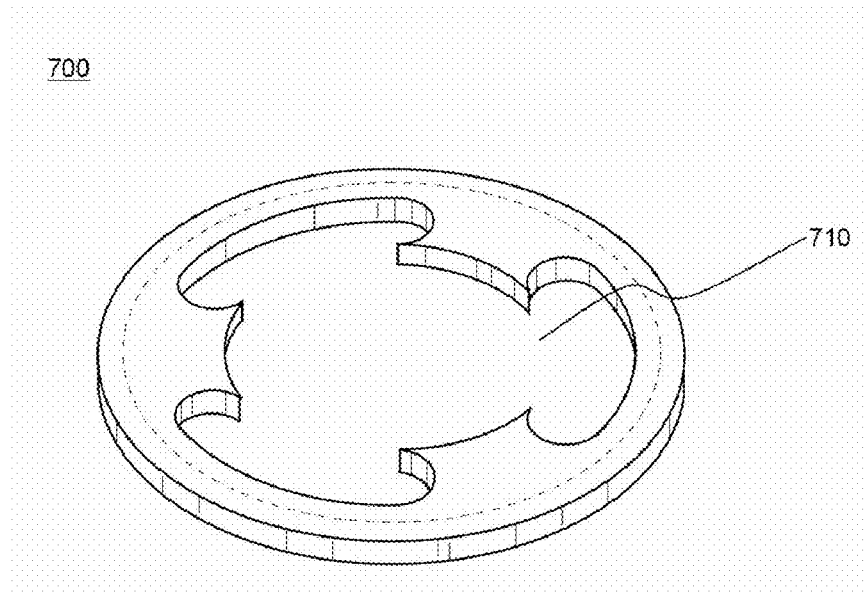
FIGS. 10 and 11 are perspective and plan views illustrating a gasket for the current interruptive device used in the secondary battery of FIG. 5, respectively.
Figure 11:
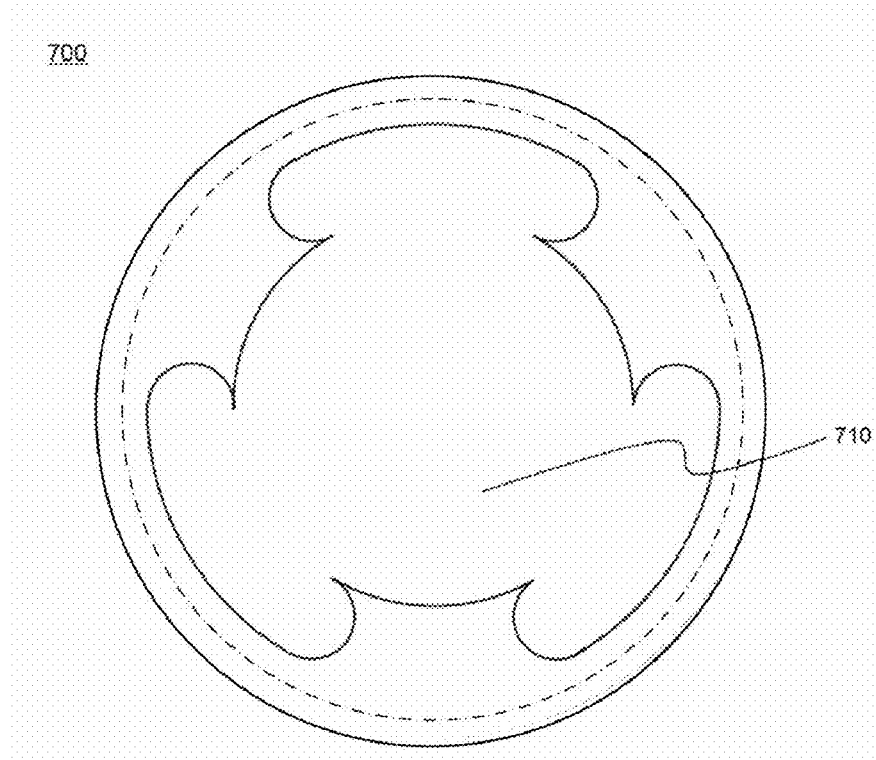

FIGS. 10 and 11 are perspective and plan views illustrating a current interruptive device gasket 700 configured to surround the current interruptive device 600, respectively. For the convenience of description, the current interruptive device gasket is simply depicted only to illustrate the shape of an opening.

Referring to FIGS. 10 and 11 together with FIG. 5, the current interruptive device gasket 700 is provided at the center thereof with an opening 710. The central opening 710 is configured in a shape not to cover the through holes 610 of the current interruptive device 600. That is, the shape of the current interruptive device gasket 700 approximately coincides with that of the outer circumference of the region of the current interruptive device 600 where no openings are formed. Consequently, the current interruptive device gasket 700 does not cover the through holes 610 of the current interruptive device 600, when the current interruptive device gasket 700 surrounds the outer circumference of the current interruptive device 600, thereby securing the function of the through holes 610 as gas discharge passages.

Figure 12:
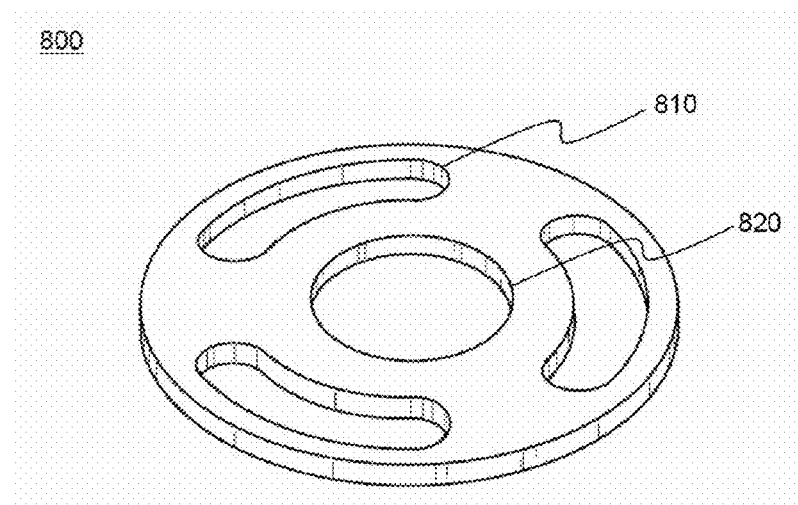
FIGS. 12 and 13 are perspective and plan views illustrating a disc-shaped insulating member used in the secondary battery of FIG. 5, respectively.
Figure 13:
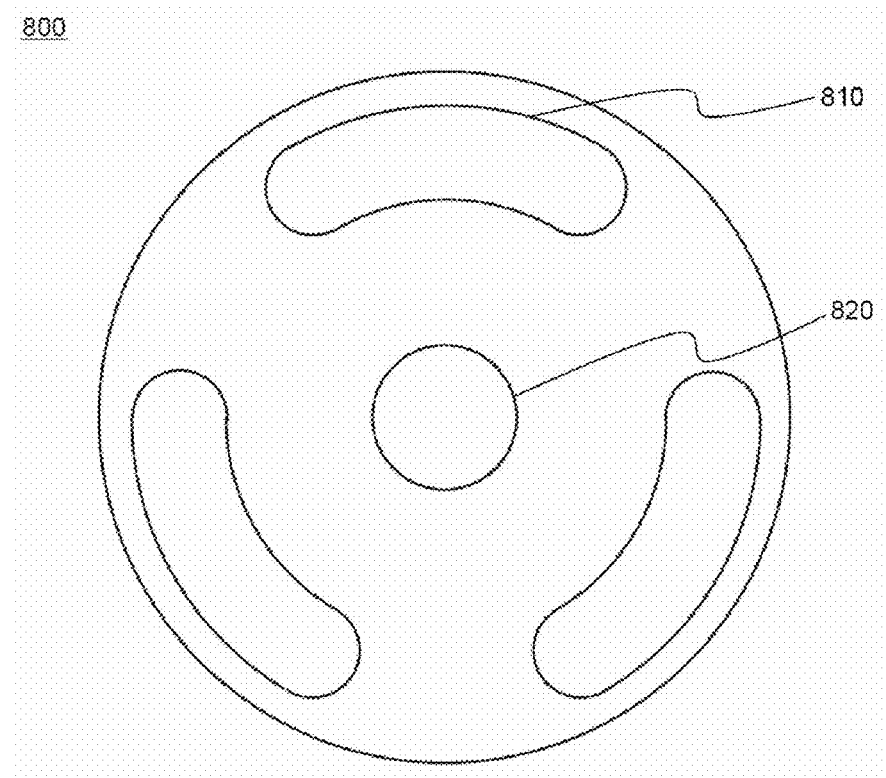

FIGS. 12 and 13 are perspective and plan views illustrating an example of a disc-shaped insulating member 800 configured to be loaded on the upper end of the jelly roll 110 of the cylindrical battery 100 of FIG. 5, respectively.

Referring to FIGS. 12 and 13 together with FIG. 5, the disc-shaped insulating member 800 is provided at the center thereof with an opening 820 for gas discharge and electrode terminal connection. Also, the disc-shaped insulating member 800 is provided at the outer circumference thereof with one or more through holes 810. The through holes 810 of the disc-shaped insulating member 800 may have a shape, size, and position corresponding to the through holes 610 of the current interruptive device 600. Also, the through holes 810 of the disc-shaped insulating member 800 have a size equivalent to approximately 30% of the area of the disc-shaped insulating member 800.

Figure 14:
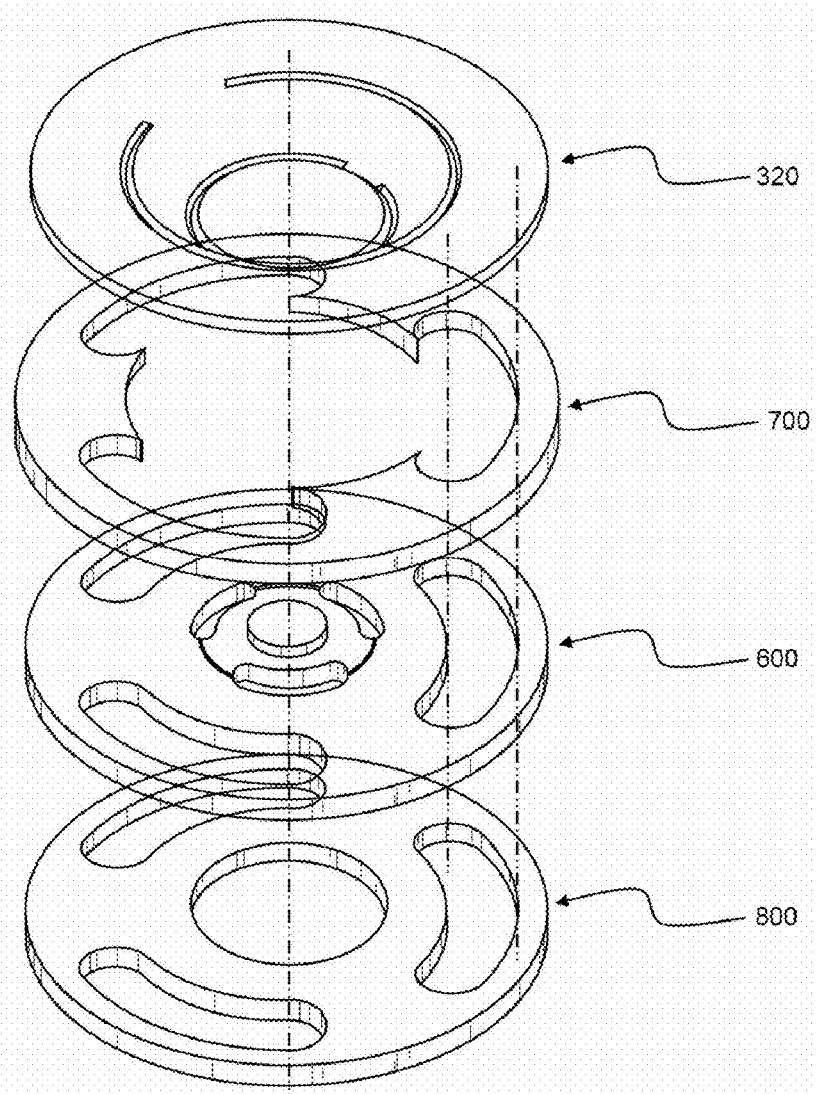
FIG. 14 is a typical view illustrating a process for stacking a disc-shaped insulating member, a current interruptive device gasket, and a current interruptive device according to an embodiment of the present invention.

FIG. 14 is a typical view illustrating the disc-shaped insulating member 800, the current interruptive device gasket 700, the current interruptive device 600, and the safety vent 320 sequentially stacked in the cylindrical battery.

Referring to FIG. 14 together with FIGS. 2 to 13, the through holes 810 of the disc-shaped insulating member 800, the central opening 710 of the current interruptive device gasket 700, the through holes 610 of the current interruptive device 600, and the first notch 324 of the safety vent 320 are aligned with one another such that pressurized gas is effectively discharged out of the battery.

Figure 15:
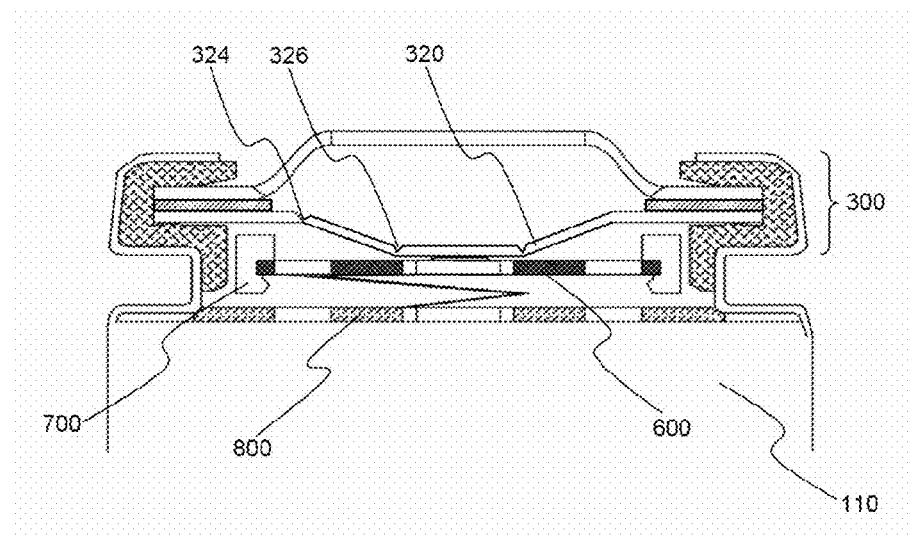
FIGS. 15 to 17 are vertical sectional views illustrating a series of processes for interrupting current and discharging high-pressure gas by the operation of a safety element in the secondary battery of FIG. 5.
Figure 16:
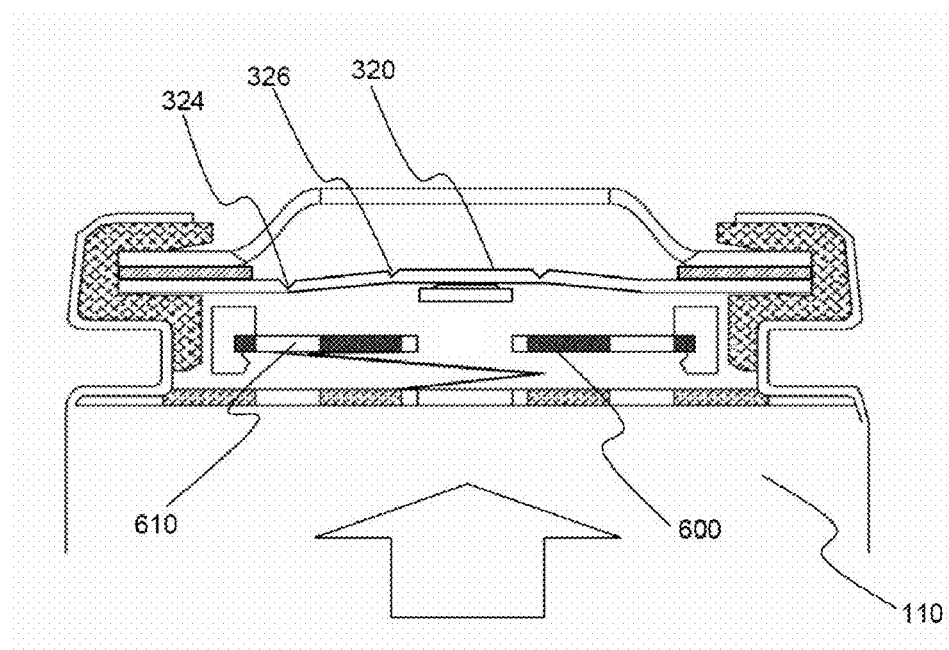
Figure 17:
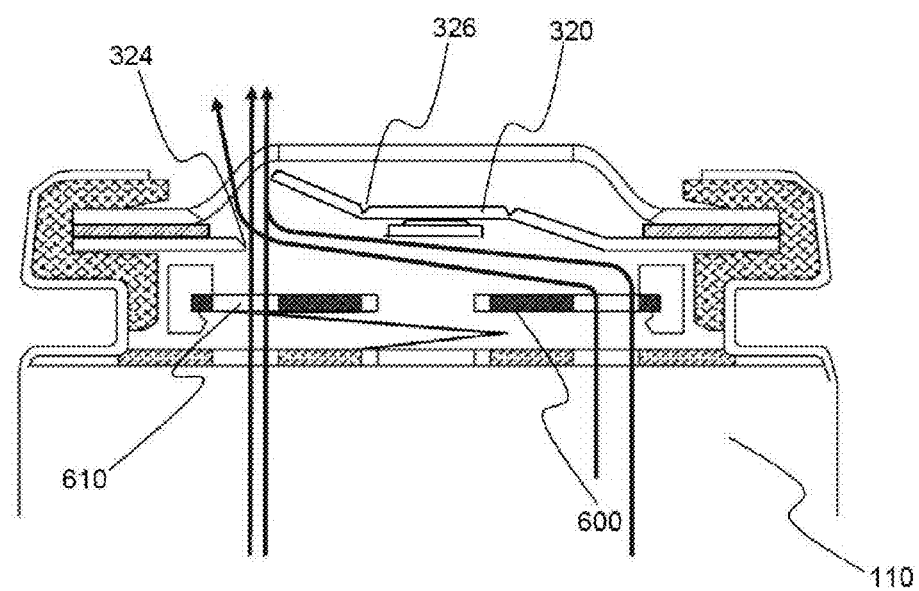

FIGS. 15 to 17 are vertical sectional views typically illustrating a series of processes for discharging pressurized gas when the internal pressure of the battery abnormally increases.

Referring to these drawings, when the internal pressure of the battery abnormally increases, pressurized gas passes through the through holes 610 and the through slits 630 of the current interruptive device 600 to apply upward pressure to the safety vent 320.

As a result, as shown in FIG. 16, the depression 322 of the safety vent 320 is raised by the pressure. As the internal pressure reaches a first critical pressure level, the protrusion 620, fixed to the depression 322 by welding, is easily separated from the current interruptive device 600 to interrupt electric conduction from the current interruptive device 600 to the safety vent 320.

When the internal pressure of the battery continuously increases in spite of the current interruption, with the result that the internal pressure of the battery reaches a second critical pressure level, as shown in FIG. 17, the first notch 324 of the safety vent 320 is cut off. As a result, pressurized gas in the battery is discharged out of the battery through the exhaust ports 312 of the top cap 310. In this embodiment, the first notch 324, having a relatively large diameter, is cut off, and therefore, the amount of discharged gas is greater than when the second notches 326, having a relatively small diameter, are cut off, thereby achieving rapid discharge of high-pressure gas.

Hereinafter, examples of the present invention will be described in more detail. It should be noted, however, that the scope of the present invention is not limited by the illustrated examples.

Example 1

As shown in FIG. 7, a first notch having a diameter of 8.0 mm and a thickness of 0.06 mm was formed in an aluminum sheet having an outer diameter of 16 mm and a thickness of 0.3 mm excluding an arc of 30 degrees, and second notches each having a diameter of 4.0 mm and a thickness of 0.1 mm were formed in the aluminum sheet excluding two arcs of 30 degrees. After that, the center of the aluminum sheet was depressed downward to form a depression having a depth of 0.65 mm. In this way, a safety vent was manufactured.

Also, as shown in FIG. 9, three through holes were radially formed at an aluminum sheet having an outer diameter of 11 mm and a thickness of 0.5 mm such that the sum of areas of the through holes was equal to approximately 30% of the entire area of the aluminum sheet. After that, a protrusion having a diameter of 1.53 mm and a protruding height of 0.20 mm was formed at the center of the aluminum sheet, and three through slits each having a width of 0.6 mm and a circumferential length of 2.61 mm were formed at positions 1.5 mm distant from the center of the central protrusion by punching. Subsequently, notches each having a thickness of approximately 70 μm were formed at bridges linking the neighboring through slits. In this way, a current interruptive device was manufactured.

Also, as shown in FIG. 11, a current interruptive device gasket was manufactured from a polypropylene sheet having an outer diameter of 12 mm and a thickness of 0.5 mm such that the current interruptive device gasket was constructed so as not to cover the through holes of the current interruptive device.

The outer circumference of the current interruptive device was inserted into the current interruptive device gasket, and the bottom of the depression of the safety vent was fixed to the top of the protrusion of the current interruptive device by laser welding.

A jelly roll type electrode assembly, which was constructed in a structure in which a porous separator made of polyethylene was disposed between a cathode made of lithium cobalt oxide and an anode made of graphite, was inserted into a cylindrical container, and a disc-shaped insulating member was mounted to the cylindrical container. After that, the top of the cylindrical container was beaded such that the disc-shaped insulating member was fixed to the cylindrical container. Subsequently, a gasket in which the safety vent, to which the current interruptive device was fixed, a PTC element, and a top cap were fitted were inserted into the beaded part. After that, the upper end of the cylindrical container was bent inward by pressing to clamp the gasket. In this way, a battery was manufactured.

Example 2

A battery was manufactured in the same method as in Example 1 except that the thickness of the first notch was 0.1 mm, and the thickness of each of the second notches was 0.06 mm, when manufacturing the safety vent.

Example 3

A battery was manufactured in the same method as in Example 1 except that the diameter of the first notch was 7 mm, and the thickness of the first notch was 0.06 mm, when manufacturing the safety vent.

Comparative Example 1

A battery was manufactured in the same method as in Example 1 except that the sum of areas of the through holes of the current interruptive device was equal to approximately 18% of the entire area of the current interruptive device.

Experimental Example 1

Nail tests were carried out on the batteries manufactured according to Examples 1 to 3 and Comparative example 1. Table 1 below reveals the results of the nail tests.

TABLE 1

| | Area ratio of through holes | Cutoff of safety vent | Explosion | Deformation of battery container |
|---|---|---|---|---|
| Example 1 | 30% | First notch | X | X |
| Example 2 | 30% | Second notches | X | Δ |
| Example 3 | 30% | Internal notch (increased diameter) | X | Δ |
| Comparative example 1 | 18% | First notch | ○ | ○ |

It can be seen from Table 1 above that, when the current interruptive device in which the area ratio of the through holes was 30% was used according to the present invention, the batteries did not explode, or the battery containers were not deformed. For the battery according to Comparative example 1 using the current interruptive device in which the area ratio of the through holes was 18%, on the other hand, the battery exploded during the nail test. Also, when the second notches were cut off, and therefore, the discharge of gas through the safety vent was not smoothly achieved, as in Examples 2 and 3, the batteries did not explode, but the battery containers were deformed.

For a high-capacity battery, it is not possible to sufficiently discharge gas when the size of the cutoff of the safety vent and the size of the through holes of the current interruptive device are not sufficiently large. When the cutoff of the safety vent corresponds to the second notches located inside, the inclined inside notch of the safety vent resists gas discharge after the notches are cut off, even though the diameter of the notches is increased.

As discussed above, it is possible to effectively discharge pressurized gas out of the battery by using the first notch as the cutoff of the safety vent as well as increasing the area of the through holes of the current interruptive device, thereby improving safety of the battery.

INDUSTRIAL APPLICABILITY

As apparent from the above description, the cap assembly according to the present invention includes the current interruptive device provided with the through holes having a relatively large area. As a result, it is possible to effectively discharge high-pressure gas out of the battery. Furthermore, when the notch, configured to rupture, of the safety vent is formed such that the notch corresponds to the through holes, it is possible to achieve the discharge of the high-pressure gas in a straight line. When high-pressure gas is generated, therefore, it is possible to achieve prompt cutoff of the safety vent and to achieve rapid discharge of the gas, thereby greatly improving safety of the battery.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A cap assembly loaded on an open upper end of a cylindrical container of a battery in which an electrode assembly is mounted in the cylindrical container, the cap assembly comprising:
    a top cap having an upward protrusion at the middle of the top cap and a plurality of exhaust ports formed along circumference of the upward protrusion;
    a safety vent having a predetermined notch configured to rupture by high-pressure gas generated in the battery;
    a current interruptive device coupled to a bottom of the safety vent by welding for interrupting current when internal pressure of the battery increases; and
    a current interruptive device gasket for surrounding an outer circumference of the current interruptive device, wherein
    the current interruptive device comprises two or more through holes formed adjacent to outer circumference of the current interruptive device for gas discharge, the through holes being formed such that the sum of areas of the through holes is equal to 20% to 50% of an entire area of the current interruptive device; and
    the safety vent is provided at a center thereof with a depression configured to be depressed downward, and the safety vent is also provided at an upper bent portion and a lower bent portion thereof forming the depression with a first notch and second notches, respectively,
    wherein the first notch is formed at the upper bent portion of the safety vent such that the through holes of the current interruptive device, the first notch of the safety vent and exhaust ports of the top cap are aligned with one another in a straight line, the first notch is configured in a shape of an open curve, one side of which is open, and the first notch has a greater depth than the second notches such that the first notch ruptures (is cut off) before the second notch,
    wherein the second notch is formed at a position closer than the first notch from the center of the safety vent, and
    wherein the first notch has an arc length corresponding to an angle of 20 to 50 degrees about the center of the safety vent.

2. The cap assembly according to claim 1, wherein the current interruptive device is constructed in a structure in which the current interruptive device is provided at a center thereof with a protrusion configured to protrude upward such that the protrusion is fixed to a bottom of a depression of the safety vent by welding, a cathode lead connected to a cathode of a jelly roll is electrically connected to the current interruptive device via the bottom of the depression excluding the protrusion, three to five through slits are formed on a concentric circle of the protrusion, and bridges are formed on the concentric circle of the protrusion for interconnecting the through slits, each of the bridges having a notch.

3. The cap assembly according to claim 1, wherein the through holes are formed in a shape of an arc such that the through holes are radially symmetrical about a center of the current interruptive device.

4. The cap assembly according to claim 1, wherein the second notches are configured in a shape of open curves, opposite ends of which are open.

5. The cap assembly according to claim 1, wherein the cap assembly is constructed in a structure in which the current interruptive device, the current interruptive device gasket, the safety vent, a positive temperature coefficient (PTC) element, and the top cap having at least one exhaust port are stacked, and a gasket is further mounted to an outer circumference of the stacked structure.

6. A cap assembly loaded on an open upper end of a cylindrical container of a battery in which an electrode assembly is mounted in the cylindrical container, the cap assembly comprising:
    a top cap having an upward protrusion at the middle of the top cap and a plurality of exhaust ports formed along circumference of the upward protrusion;

a safety vent having a predetermined notch configured to rupture by high-pressure gas generated in the battery;

a current interruptive device coupled to a bottom of the safety vent by welding for interrupting current when internal pressure of the battery increases; and a current interruptive device gasket for surrounding an outer circumference of the current interruptive device, wherein the current interruptive device comprises two or more through holes formed adjacent to outer circumference of the current interruptive device for gas discharge, the through holes being formed such that the sum of areas of the through holes is equal to 20% to 50% of an entire area of the current interruptive device; and the safety vent is provided at a center thereof with a depression configured to be depressed downward, and the safety vent is also provided at an upper bent portion and a lower bent portion thereof forming the depression with a first notch and second notches, respectively, wherein the first notch is formed at the upper bent portion of the safety vent such that the through holes of the current interruptive device, the first notch of the safety vent and exhaust ports of the top cap are aligned with one another in a straight line, the first notch is configured in a shape of an open curve, one side of which is open, and the first notch has a greater depth than the second notches such that the first notch ruptures (is cut off) before the second notch, wherein the second notch is formed at a position closer than the first notch from the center of the safety vent, and wherein the current interruptive device gasket is provided at a center thereof with an opening, and the central opening is configured in a shape not to cover any portion of the through holes of the current interruptive device.

7. The cap assembly according to claim 6, wherein the through holes of the current interruptive device, the opening of the current interruptive device gasket, and the first notch of the safety vent are aligned with one another in a straight line such that the through holes of the current interruptive device, the opening of the current interruptive device gasket, and the notch of the safety vent communicate with one another.

8. A cylindrical battery comprising the cap assembly according to claim 1 and an electrode assembly (jelly roll) of a cathode/separator/anode structure.

9. The cylindrical battery according to claim 8, further comprising a disc-shaped insulating member loaded on an upper end of the jelly roll, wherein the disc-shaped insulating member is provided at a center thereof with an opening for gas discharge and electrode terminal connection, and the disc-shaped insulating member is provided around the opening with at least one through hole, the at least one through hole having a size equivalent to 20% to 50% of an area of the disc-shaped insulating member.

10. The cylindrical battery according to claim 9, wherein the at least one through hole of the disc-shaped insulating member is aligned with the opening of the current interruptive device gasket and the through holes of the current interruptive device in a straight line such that the at least one through hole of the disc-shaped insulating member communicates with the opening of the current interruptive device gasket and the through holes of the current interruptive device.

* * * * *